US008037466B2

(12) United States Patent  
Guo et al.

(10) Patent No.: US 8,037,466 B2  
(45) Date of Patent: Oct. 11, 2011

(54) METHOD AND APPARATUS FOR MERGING CRITICAL SECTIONS

(75) Inventors: Xiaofeng Guo, Shanghai (CN); Jinquan Dai, Shanghai (CN); Long Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1320 days.

(21) Appl. No.: 11/648,334

(22) Filed: Dec. 29, 2006

(65) Prior Publication Data

US 2008/0163181 A1   Jul. 3, 2008

(51) Int. Cl.  
G06F 9/45 (2006.01)  
G06F 13/00 (2006.01)

(52) U.S. Cl. ......................... 717/159; 717/149; 711/168

(58) Field of Classification Search ........................ None  
See application file for complete search history.

(56) References Cited

U.S. PATENT DOCUMENTS

| | | |
|---|---|---|
| 4,571,678 A | 2/1986 | Chaitin |
| 5,107,418 A | 4/1992 | Cramer et al. |
| 5,202,993 A | 4/1993 | Tarsy et al. |
| 5,303,377 A | 4/1994 | Gupta et al. |
| 5,544,342 A | 8/1996 | Dean |
| 5,557,761 A | 9/1996 | Chan et al. |
| 5,712,791 A | 1/1998 | Lauterbach |
| 5,774,730 A | 6/1998 | Aizikowitz et al. |
| 5,867,711 A | 2/1999 | Subramanian et al. |
| 6,006,326 A | 12/1999 | Panwar et al. |
| 6,038,538 A | 3/2000 | Agrawal et al. |
| 6,044,222 A | 3/2000 | Simons et al. |
| 6,243,864 B1 | 6/2001 | Odani et al. |
| 6,289,507 B1 * | 9/2001 | Tanaka et al. .................. 717/155 |
| 6,305,014 B1 | 10/2001 | Roediger et al. |
| 6,427,235 B1 | 7/2002 | Kosche et al. |
| 6,611,956 B1 | 8/2003 | Ogawa et al. |
| 6,651,246 B1 | 11/2003 | Archambault et al. |
| 6,654,952 B1 | 11/2003 | Nair et al. |
| 6,732,260 B1 | 5/2004 | Wang et al. |
| 6,785,796 B1 | 8/2004 | Damron et al. |
| 6,795,963 B1 * | 9/2004 | Andersen et al. ............. 717/130 |
| 6,820,223 B2 | 11/2004 | Heishi et al. |
| 7,120,762 B2 | 10/2006 | Rajwar et al. |
| 7,197,747 B2 | 3/2007 | Ishizaki et al. |
| 7,290,239 B1 | 10/2007 | Singh et al. |

(Continued)

FOREIGN PATENT DOCUMENTS

CN   1561480   1/2005

(Continued)

OTHER PUBLICATIONS

Pending U.S. Appl. No. 10/582,427, filed Jun. 8, 2006 (inventor: Xiaofeng Guo et al.).

(Continued)

*Primary Examiner* — Michael J Yigdall  
*Assistant Examiner* — Ben Wang  
(74) *Attorney, Agent, or Firm* — Trop, Pruner & Hu, P.C.

(57) ABSTRACT

Critical sections used for multiple threads in a parallel program to access shared resource may be selected to merge with each other to reduce the number of signals/tokens used to create critical sections. Critical section merge may be based on a summarized dependence graph which is obtained from an instruction level dependence graph constructed based on a result of critical section minimization.

13 Claims, 6 Drawing Sheets

U.S. PATENT DOCUMENTS

| | | | |
|---|---|---|---|
| 7,516,312 B2 | 4/2009 | Wang et al. | |
| 7,555,634 B1 | 6/2009 | Thatipelli et al. | |
| 2002/0013937 A1 | 1/2002 | Ostanevich et al. | |
| 2002/0066090 A1 | 5/2002 | Babaian | |
| 2002/0095666 A1 | 7/2002 | Tabata et al. | |
| 2002/0095668 A1 | 7/2002 | Koseki et al. | |
| 2003/0074654 A1 | 4/2003 | Goodwin et al. | |
| 2003/0120480 A1 | 6/2003 | Mohri et al. | |
| 2003/0208673 A1* | 11/2003 | Chaudhry et al. | 712/200 |
| 2004/0025152 A1 | 2/2004 | Ishizaki et al. | |
| 2004/0025153 A1 | 2/2004 | Johnson et al. | |
| 2004/0039900 A1 | 2/2004 | Heishi et al. | |
| 2004/0073906 A1 | 4/2004 | Chamdani | |
| 2004/0083468 A1 | 4/2004 | Ogawa et al. | |
| 2004/0111708 A1 | 6/2004 | Calder et al. | |
| 2004/0133886 A1 | 7/2004 | Wu | |
| 2004/0187101 A1 | 9/2004 | Inagaki et al. | |
| 2004/0193856 A1 | 9/2004 | Wang et al. | |
| 2005/0050527 A1 | 3/2005 | McCrady et al. | |
| 2005/0055533 A1 | 3/2005 | Kadambi | |
| 2005/0060705 A1 | 3/2005 | Katti et al. | |
| 2005/0108695 A1* | 5/2005 | Li et al. | 717/144 |
| 2005/0108696 A1 | 5/2005 | Dai et al. | |
| 2005/0149916 A1 | 7/2005 | Shpeisman et al. | |
| 2005/0177831 A1 | 8/2005 | Goodman et al. | |
| 2005/0188184 A1 | 8/2005 | Senter | |
| 2005/0204119 A1 | 9/2005 | Saha | |
| 2005/0210208 A1* | 9/2005 | Long et al. | 711/159 |
| 2005/0257221 A1 | 11/2005 | Inchingolo et al. | |
| 2006/0048124 A1 | 3/2006 | Martin | |
| 2006/0053351 A1 | 3/2006 | Anderson et al. | |
| 2006/0085782 A1 | 4/2006 | Ward | |
| 2007/0169039 A1* | 7/2007 | Lin | 717/146 |
| 2009/0049433 A1* | 2/2009 | Li et al. | 717/149 |
| 2009/0089765 A1* | 4/2009 | Guo et al. | 717/144 |
| 2009/0113396 A1 | 4/2009 | Rosen et al. | |
| 2009/0265530 A1* | 10/2009 | Guo et al. | 712/227 |

FOREIGN PATENT DOCUMENTS

| | | |
|---|---|---|
| CN | 1670699 | 9/2005 |
| WO | WO 2005/062170 | 7/2005 |

OTHER PUBLICATIONS

Pending U.S. Appl. No. 10/582,204, filed Jun. 8, 2006 (inventor: Xiaofeng Guo et al).

Pending PCT Application No. PCT/CN2005/002307 filed Dec. 24, 2005 (inventor: Paul Li et al).

U.S. Patent and Trademark Office, Final Office Action mailed Feb. 16, 2011 in U.S. Appl. No. 10/582,204.

U.S. Patent and Trademark Office, Office Action mailed Aug. 13, 2010 with Reply filed Nov. 15, 2010 in U.S. Appl. No. 10/582,204.

U.S. Patent and Trademark Office, Final Office Action mailed Feb. 1, 2011 in U.S. Appl. No. 10/582,427.

U.S. Patent and Trademark Office, Office Action mailed Aug. 18, 2010 with Reply filed Nov. 18, 2010 in U.S. Appl. No. 10/582,427.

U.S. Patent and Trademark Office, Final Office Action mailed Mar. 1, 2011 in U.S. Appl. No. 11/662,217.

U.S. Patent and Trademark Office, Office Action mailed Sep. 29, 2010 with Reply filed Feb. 4, 2011 in U.S. Appl. No. 11/662,217.

International Searching Authority, International Search Report and Written Opinion dated Dec. 18, 2006 for International application No. PCT/US2006/000162.

Midkiff, et al., "Compiler Algorithms for Synchronizations," IEEE Transaction on Computers, col. C-36, No. 12, Dec. 1987, pp. 1485-1497.

European Patent Office, European Search Report dated Mar. 17, 2011 for Application No. 10252004.6-2211.

Pohua P. Chang, et al., "IMPACT: An Architectural Framework for Multiple-Instruction-Issue Processors," Proceedings of the 18th International Symposium on Computer Architecture 1991, pp. 266-275.

* cited by examiner

METHOD AND APPARATUS FOR MERGING CRITICAL SECTIONS

RELATED APPLICATION

This application is related to commonly assigned U.S. application Ser. No. 10/582,204, filed by Xiaofeng Guo, Jinquan Dai, and Long Li with an effective filing date of Jan. 26, 2006 and entitled "Scheduling Multithreaded Programming Instructions Based on Dependency Graph," and is related to commonly assigned U.S. application Ser. No. 10/582,427, filed by Xiaofeng Guo, Jinquan Dai, Long Li, and Zhiyuan Lv with an effective filing date of Nov. 17, 2005 and entitled "Latency Hiding of Traces Using Block Coloring," and is related to commonly assigned U.S. application Ser. No. 11/662,217, filed by Xiaofeng Guo, Jinquan Dai, and Long Li with an effective filing date of Dec. 24, 2005 (the PCT application designating the U.S. was filed on this date) and entitled "Automatic Critical Section Ordering for Parallel Program."

BACKGROUND

1. Field

This disclosure relates generally to compiling technologies in a computing system, and more specifically but not exclusively, to method and apparatus for merging critical sections when compiling a computer program.

2. Description

Multithreading and multiprocessing are common programming techniques often used to maximize the efficiency of computer programs by providing a tool to permit concurrency or multitasking. Threads are ways for a computer program to be divided into multiple and distinct sequences of programming instructions where each sequence is treated as a single task and to be processed simultaneously. An application that may use the multithreaded programming technique is a packet-switched network application that processes network packets in a high speed packet-switched system concurrently.

To maintain and organize the different packets, a new thread may be created for each incoming packet. In a single processor environment, the processor may divide its time between different threads. In a multiprocessor environment, different threads may be processed on different processors. For example, the Intel® IXA™ network processors (IXPs) have multiple microengines (MEs) processing network packets in parallel where each ME supports multiple threads.

In such a parallel programming paradigm, accesses to shared resources, including shared memory, global variables, shared pipes, and so on, are typically be protected by critical sections to ensure mutual exclusiveness and synchronizations between threads. Normally, critical sections are created by using a signal mechanism in a multiprocessor system. A signal may be used to permit the entering or to indicate the exiting of a critical section. For instance, in an Intel® IXP™, packets are distributed to a chain of threads in order (i.e., an earlier thread in the chain processes an earlier packet). Each thread waits for a signal from the previous thread before entering the critical section. After the signal is received, the thread executes the critical section code exclusively. Once this thread is done, it sends the signal to the next thread after leaving the critical section.

Due to hardware cost, the number of signals is limited by the scale of processing element. For example, each thread only has 16 signals in Intel® IXP™ MEs. Excessive use of critical sections may adversely impact the performance of a program. Therefore, it is desirable to efficiently use critical sections.

BRIEF DESCRIPTION OF THE DRAWINGS

The features and advantages of the disclosed subject matter will become apparent from the following detailed description of the subject matter in which.

DETAILED DESCRIPTION

According to embodiments of the subject matter disclosed in this application, critical sections used for multiple threads in a program to access shared resource may be minimized. A trace-based instruction level dependence graph may be constructed based on the result of the critical section minimization. The dependence graph so constructed may be summarized. Additionally, critical sections in the program may be selected to merge with each other based on the summarized dependence graph to reduce the number of signals/tokens used to create critical sections. Furthermore, latency-sensitive optimizations may be applied to hide resource access latency.

Reference in the specification to "one embodiment" or "an embodiment" of the disclosed subject matter means that a particular feature, structure or characteristic described in connection with the embodiment is included in at least one embodiment of the disclosed subject matter. Thus, the appearances of the phrase "in one embodiment" appearing in various places throughout the specification are not necessarily all referring to the same embodiment.

Figure 1:
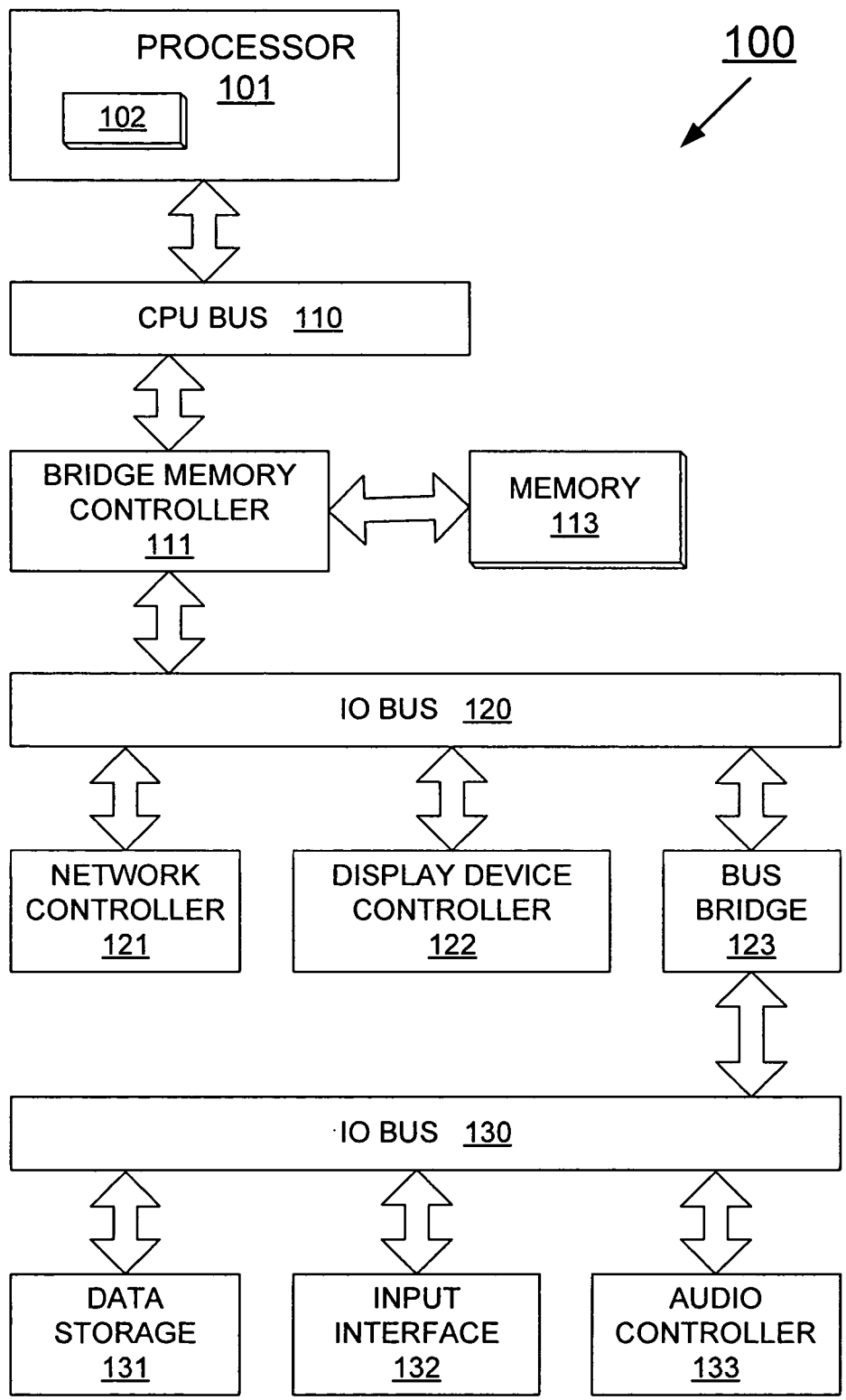
FIG. 1 is a block diagram of an exemplary computing system in which an example embodiment of the present invention may be implemented.

FIG. 1 is a block diagram of an exemplary computing system 100 in which an example embodiment of the present invention may be implemented. The computing system 100 includes a processor 101 that processes data and a memory 113. The processor 101 may have multiple or many processing cores (for brevity of description, term "multiple cores" will be used hereinafter to include both multiple processing cores and many processing cores). The processor 101 may be a complex instruction set microprocessor, a reduced instruction set computing microprocessor, a very long instruction word computer microprocessor, a processor implementing a combination of instruction sets, or other processor device. FIG. 1 shows the computing system 100 with a single processor. However, it is understood that the computing system 100 may operate with multiple processors. Additionally, each of the one or more processors may support one or more hardware threads. The processor 101 is coupled to a CPU (Central Processing Unit) bus 110 that transmits data signals between processor 101 and other components in the computing system 100.

The memory 113 may be a dynamic random access memory ("DRAM") device, a static random access memory ("SRAM") device, read-only memory ("ROM"), a synchronous DRAM ("SDRAM") device, a Double Data Rate ("DDR") SDRAM device, and/or other memory device. The memory 113 may store instructions and code represented by data signals that may be executed by the processor 101. According to an embodiment of the computing system 100, a compiler may be stored in the memory 113 and implemented by the processor 101 in the computing system 100. The compiler may construct an instruction-level dependence graph and summarize the dependence graph so constructed. According to an embodiment of the subject matter disclosed in this application, the summarized dependence graph may be used to merge critical sections to save signals needed for critical section creations and to reduce the number of overall instructions in an execution path of a program.

A cache 102 may reside inside processor 101 to store data stored in memory 113. The cache 102 speeds access to memory by the processor 101 by taking advantage of its locality of access. In an alternative embodiment of the computing system 100, the cache 102 may reside external to the processor 101. In another embodiment, the cache 102 may include multiple levels, such as level 1 cache (L1 cache), level 2 cache (L2 cache), level 3 cache, and so on, with one or more levels (e.g., L1 cache) residing inside the processor 101 and others residing outside the processor 101. A bridge memory controller 111 directs data signals between the processor 101, the memory 113, and other components in the computing system 100 and bridges the data signals between the CPU bus 110, the memory 113, and a first IO (Input/Output) bus 120.

The first IO bus 120 may be a single bus or a combination of multiple buses. The first IO bus 120 provides communication links between components in the computer system 100. A network controller 121 may be coupled to the first IO bus 120. The network controller 121 may link the computing system 100 to a network of computers (not shown) and support communication among the computers. A display device controller 122 may be coupled to the first IO bus 120. The display device controller 122 allows coupling of a display device (not shown) to the computing system 100 and acts as an interface between the display device and the computing system 100.

A second IO bus 130 may be a single bus or a combination of multiple buses. The second IO bus 130 may provide communication links between components in the computing system 100. A data storage device 131 is coupled to the second IO bus 130. The data storage device 131 may be hard disk drive, a floppy disk drive, a compact disc ("CD") ROM device, a flash memory device or other mass storage device. An input interface 132 may be coupled to the second IO bus 130. The input interface 132 may be, for example, a keyboard and/or mouse controller to other input interface. The input interface 132 may be a dedicated device or can reside in another device such as a bus controller or other controller. The input interface 132 allows coupling of an input device to the computing system 100 and transmits data signals from an input device to the computing system 100. An audio controller 133 may be coupled to the second IO bus 130. The audio controller 133 operates to coordinate the recording and playing of sounds by a device such as an audio codec which is also coupled to the IO bus 130. A bus bridge 123 couples the first IO bus 120 and the second IO bus 130. The bus bridge 123 operates to buffer and bridge data signals between the first IO bus 120 and the second IO bus 130.

When a program is executed in the computing system 100, it may be executed in multiple threads. In one embodiment, all of the threads may be running on processor 101. In another embodiment, threads may be distributed and run on multiple processor or processing cores. Threads communicate to other threads through shared resources such as global memory, registers, or signals. In many instances, the shared resource may only be accessed by one thread. Such an exclusive access of the shared resource by one thread at a time may be implemented by using a critical section. A conventional method to implement a critical section is to use a signal mechanism. A thread may enter a critical section after receiving a signal and exiting the critical section by notifying the next thread that it is done and by passing a signal to the next thread.

Figure 2:
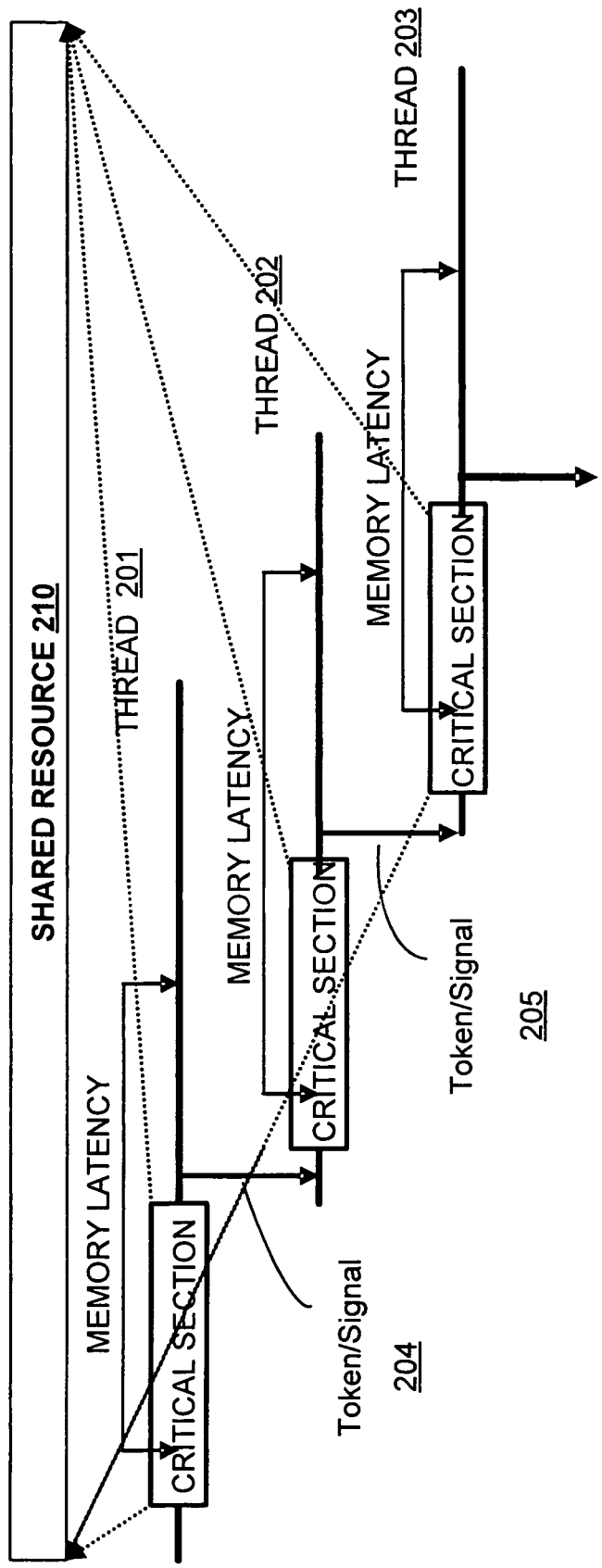
FIG. 2 illustrates an example of signal-based critical sections.

FIG. 2 illustrates an example of signal-based critical sections. A thread 202 waits for a token or signal 204 from a previous thread 201. After accessing its critical section, the thread 202 then passes a token or signal 205 to a thread 203. Before the thread 203 receives the token or signal 205, the thread 202 has exclusive access to a shared resource 210.

Typically it takes time to access the shared resource. This time is referred to as resource access latency, which is measured between the instant when resource access (e.g., memory access) is initiated and the instant when the accessed data in the resource is effective. If resource access latency is included in a critical section, the processor or processing core executing the thread that has entered this critical section will be idle during this latency period. This results in inefficient use of computing power. One way to improve the efficiency of a computing system running multiple threads is to hide resource access latency or overlap resource access latency in one thread with resource access latency and/or other computations in other threads.

Figures 3A, 3B:
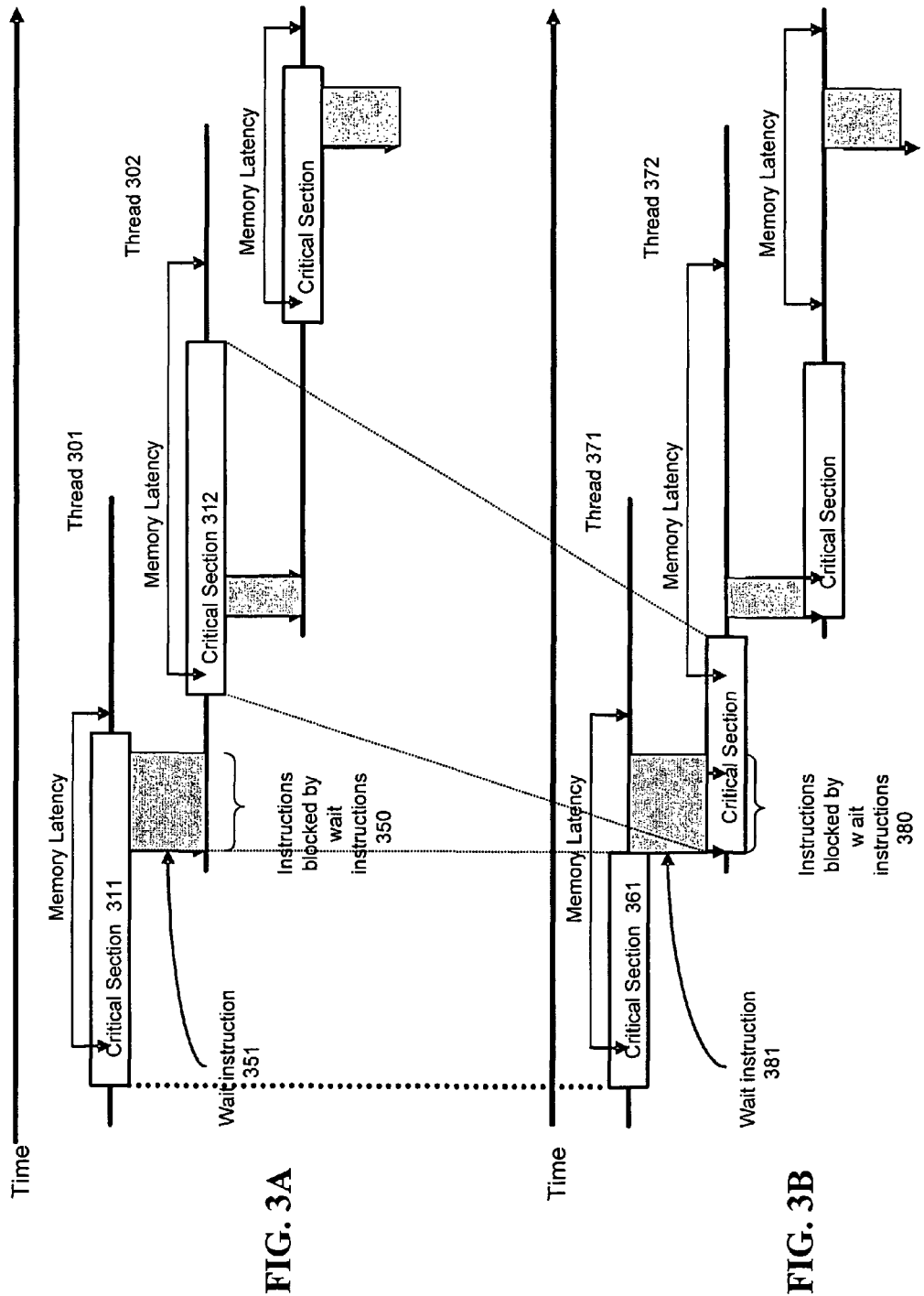
FIGS. 3A and 3B illustrate an example of moving instructions outside of a critical section to shorten the critical section according to an example embodiment of the present invention.

FIGS. 3A and 3B illustrate an example of moving instructions outside of a critical section to shorten the critical section according to an example embodiment of the present invention. In a token or signal based critical section described in FIG. 2, thread 302 may wait until thread 301 exits a critical section 311 before thread 302 may begin to execute its instructions in a critical section 312. A shaded block 350 represents the instructions blocked by a wait instruction 351. Since the wait instruction 351 already blocks all the subsequent instructions in 350, the instructions in 350 may be moved outside of the critical section 311 and not affecting the sequence in which the instructions may be executed.

When the wait instruction 351 is moved outside of the critical section 311, the critical section 311 may be shortened. As depicted in FIG. 3B, a critical section 361 is shorter than the critical section 311 depicted in FIG. 3A. As a result, thread 371 may release the critical section 361 to thread 372 sooner than thread 301 releases the critical section 311 to thread 302. In this embodiment of the invention, the wait instruction 351 is moved to a location indicated by 381 and the instructions blocked by the wait instructions, 350, are moved to a location indicated by 380. When critical sections are shortened as much as they may be shortened, a multithreaded program may be executed efficiently.

When resource access latency and other unnecessary instructions are removed out of critical sections, it may become more effective to merge shortened critical sections to reduce the number of signals used by critical sections than merge un-shortened critical sections.

Figure 4:
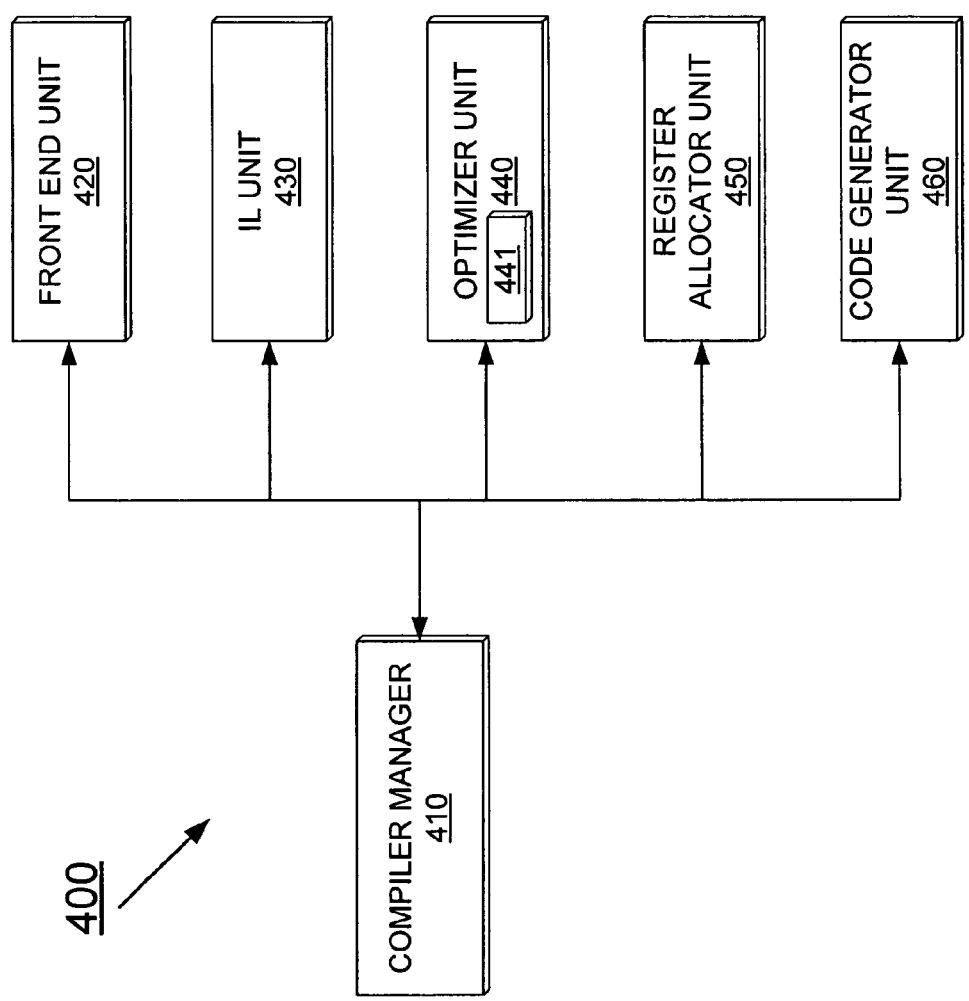
FIG. 4 is a block diagram that illustrates a compiler according to an example embodiment of the present invention.

FIG. 4 is a block diagram that illustrates a compiler 400 that may include a critical section merging apparatus, according to an example embodiment of the present invention. The compiler 400 may include a compiler manager 410. The compiler manager 410 receives source code to compile. The compiler manager 410 interfaces with and transmits information between other components in the compiler 400.

The compiler 400 may include a front end unit 420. According to an embodiment of the compiler 400, the front end unit 420 operates to parse source code and convert it to an abstract syntax tree. The compiler 400 may also include an intermediate language ("IL") unit 430. The IL unit 430 transforms the abstract syntax tree into a common intermediate form such as an intermediate representation. It should be appreciated that the IL unit 430 may transform the abstract syntax tree into one or more common intermediate forms.

The complier may include an optimizer unit 440. The optimizer unit 440 may utilize one or more optimization procedures to optimize the intermediate representation of the code. According to an embodiment of the compiler 440, the optimizer unit 440 may perform peephole, local, loop, global, interprocedural and/or other optimizations. According to an embodiment of the compiler 440, the optimizer unit 440 includes a critical section merging apparatus 441. The critical section merging apparatus 441 may minimize critical sections and construct a trace-based instruction level dependence graph based on the result of the critical section minimization. Additionally, the critical section merging apparatus 441 may summarize the dependence graph so constructed. Moreover, the critical section merging apparatus 441 may merge critical sections based on the summarized dependence graph. Moreover, the critical section merging apparatus 441 may apply latency-sensitive optimizations to hide resource access latency.

The compiler 400 may include a register allocator unit 450. The register allocator unit 450 identifies data in the intermediate representation that may be stored in registers in the processor rather than in memory. Additionally, the compiler 400 may include a code generator 460. The code generator 460 converts the intermediate representation into machine or assembly code.

Figure 5:
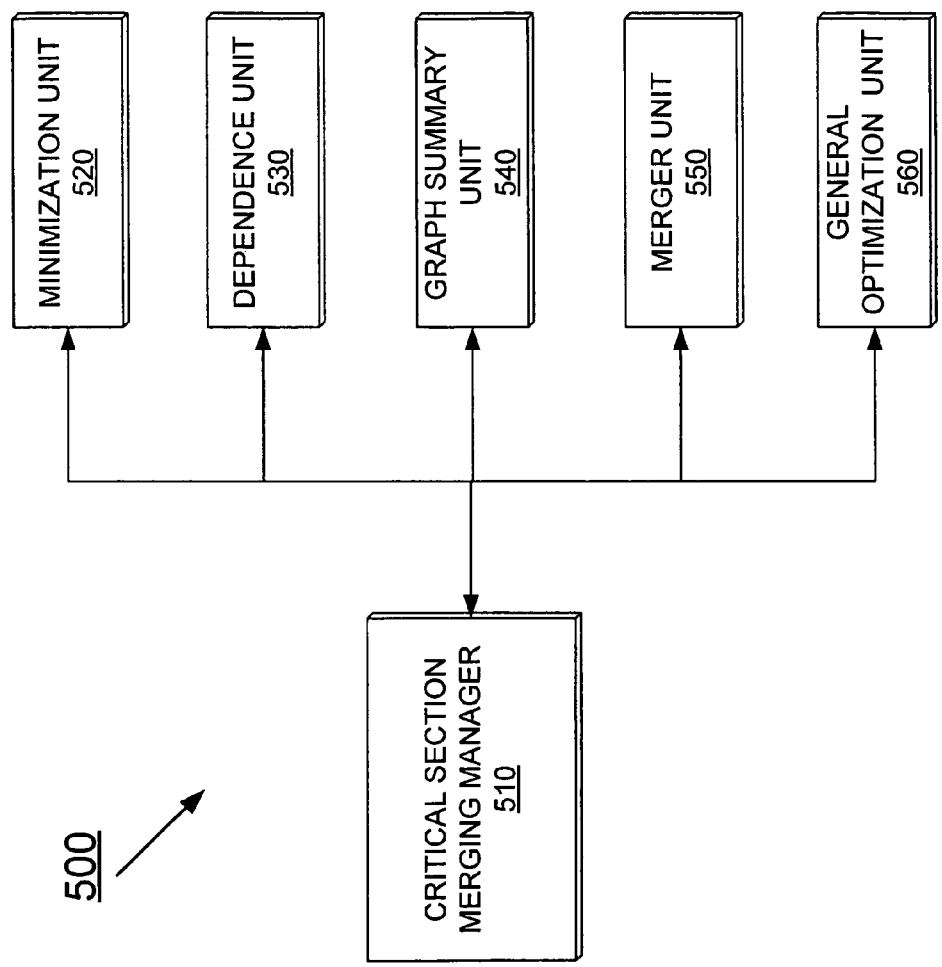
FIG. 5 is a block diagram of an exemplary critical section merging apparatus according to an example embodiment of the present invention.

FIG. 5 is a block diagram of an exemplary critical section merging apparatus 500 according to an example embodiment of the present invention. The critical section merging apparatus 500 may be used to implement the critical section merging apparatus 441 shown in FIG. 4. The critical section merging apparatus 500 includes a critical section merging manager 510. The critical section merging manager 510 interfaces with and transmits information between other components in the critical section merging apparatus 500.

The critical section merging apparatus 500 may include a minimization unit 520. The minimization unit 520 may perform critical section minimization. The minimization unit 520 may employ any method or a combination of a variety of methods to minimize each critical section by identifying a portion of instructions that could be executed outside of the critical section and by removing such a portion of instructions out of the critical section. The commonly assigned U.S. patent application Ser. No. 10/582,204 entitled "Scheduling Multithreaded Programming Instructions Based on Dependency Graph," filed by Xiaofeng Guo, Jinquan Dai, and Long Li with an effective filing date of Jan. 26, 2006, and the commonly assigned U.S. patent application Ser. No. 10/582,427 entitled "Latency Hiding of Traces Using Block Coloring," filed by Xiaofeng Guo, Jinquan Dai, Long Li, and Zhiyuan Lv with an effective filing date of Nov. 17, 2005 describe some methods for shortening critical sections and thus minimizing the length of critical sections. These two U.S. patent applications are incorporated by reference herein.

As mentioned above, using multi-threading technology is one approach to shorten critical sections. It is estimated that if all memory accesses latency can be hidden and the computations out of critical section can be used on hiding the memory accesses latency by using a multi-threading technology in a single processor, the execution speed of the program may be sped up by:

$$\text{Speed-}up1 = \frac{C_c + \sum_{i=1}^{C_m} L_i}{C_c + C_m}, \quad (1)$$

where $C_c$ denotes cycles for computation; $C_m$ denotes times of memory accesses; and $L_i$ denotes the $i^{th}$ memory access latency. When multiple processors or processing cores are used for the multiple threads, the execution speed of the program may be sped up by:

$$\text{Speed-}up2 = \frac{C_c + \sum_{i=1}^{C_m} L_i}{C_{cs}}, \quad (2)$$

where $C_{cs}$ denotes computations in the largest critical section. It may be noted from Equation (2) that the critical section size acts as one of the most important parameter in evaluating the performance of a multi-processor system.

The critical section merging apparatus 500 may include a dependence unit 530. The dependence unit 530 generates an instruction dependence graph of instructions in the code. According to an embodiment of the critical section merging apparatus 500, the dependence unit 530 generates the instruction dependence graph by constructing a control flow graph of the code, computing flow dependence and output dependence of instructions by using a forward and disjunctive data flow, computing anti-dependence of the instructions by using a backward and disjunctive data flow, and adding the flow dependence and output dependence of instructions with the anti-dependence of the instructions. It should be appreciated that other techniques may be used to generate the instruction dependence graph.

The critical section merging apparatus 500 may include a graph summary unit 540. The graph summary unit 540 generates a summarized graph reflecting only instructions that protect and release the critical sections. According to an embodiment of the critical section merging apparatus 500, the graph summary unit 540 generates the summarized graph by building a transitive closure of the instruction dependence graph generated by the dependence unit 530, and adding an edge from a node n to a node m if there is a path from the node n to the node m in the instruction dependence graph, where n and m represent instructions that start or release a critical section or instructions of resource accesses. It should be appreciated that other techniques may be used to generate the summarized dependence graph.

The critical section merging apparatus 500 includes a merger unit 550. The merger unit 550 merges critical sections based on the summarized dependence graph generated by the graph summary unit 540. After the summarized dependence graph is created, the merger unit 550 may select certain critical sections to merge based on rules below:

[Rule] Merge CS1 and CS2 if and only if:
(1) CS1 is conjoint with CS2 on any trace; or
(2) For any resource access ("RA"), neither (CS1Begin→RA→CS2End) nor (CS2Beigin→RA→CS1End) is in the summarized dependence graph.

CS1 and CS2 above represent critical section 1 and critical section 2, respectively. CSxBegin is the beginning instruction of critical section x; and CSxEnd is the ending instruction of critical section x.

The critical section merging apparatus 500 may include a general optimization unit 560. The general optimization unit 560 applies general optimization methods such as code motion, code scheduling, copy optimizations to hide resource access latency. The commonly assigned U.S. patent application Ser. No. 10/582,427 entitled "Latency Hiding of Traces Using Block Coloring," filed by Xiaofeng Guo, Jinquan Dai, Long Li, and Zhiyuan Lv with an effective filing date of Nov. 17, 2005 describes several approaches to optimize code so that resource access latencies may be hid. This patent application is incorporated by reference herein.

Figure 6:
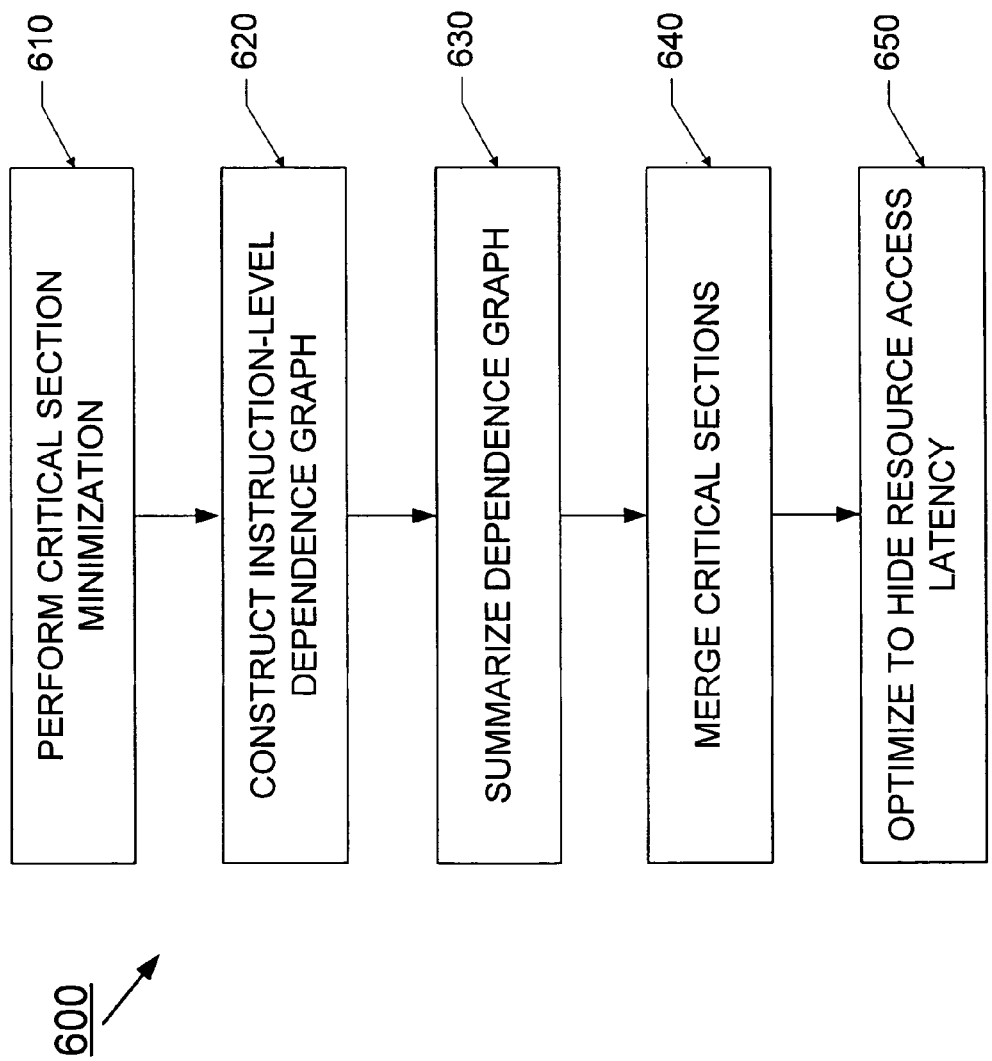
FIG. 6 is a flowchart of one example process for merging critical sections according to an example embodiment of the present invention.

FIG. 6 is a flowchart of one example process 600 for merging critical sections according to an example embodiment of the present invention. At block 610, the size of critical sections may be minimized by using any critical section minimization approach or a combination of several approaches, for example, using computations outside a critical section to hide resource access latency. At block 620, an instruction-level dependence graph may be constructed. In construction an instruction-level dependence graph, later optimizations for hiding resource access latency may need to be considered in adding control dependence to improve the overall performance for critical section merge. At block 630, a summarized dependence graph may be created for beginning instructions and ending instructions of critical sections and resource accesses based on the instruction-level dependence graph constructed at block 620. Only beginning instructions ("CSBegin") and ending instructions ("CSEnd") of critical sections and resource accesses may be reserved in the summarized dependence graph. The summarized dependence graph may be created by building a transitive closure based on the instruction deperidence graph constructed at block 620, and adding an edge from a node n to a node m if there is a path from the node n to the node m in the instruction dependence graph, where n and m represent CSBegin, CSEnd, and resource access instructions. Resource accesses that are protected by critical sections will be eliminated from the summarized graph, e.g., for any resource access in the summarized dependence graph, if CSiBegin→RA→CSiEnd, RA will be removed from the summarized dependence graph.

It should be appreciated that any other techniques used for constructing an instruction-level dependence graph and summarizing the dependence graph so constructed may be used at block 620 and block 630. The commonly assigned PCT patent application No. PCT/CN2005/002307 entitled "Automatic Critical Section Ordering for Parallel Program," filed by Jinquan Dai, Long Li, and Xiaofeng Guo on Dec. 24, 2005 describes approaches to constructing an instruction dependence graph and summarizing the graph so constructed. This patent application is incorporated by reference herein.

At block 640, critical sections may be selected to merge based on the rule described above along with the FIG. 5 description. Pseudo code for merging critical sections is also shown below:

```
/* DG is the summarized dependence graph. */
For (cp in trace-set) /* cp stands for "critical path". */
{
    For (CS1 on cp)
    {
        CS2 = cp.next[CS1]; /* CS2 is a critical section next to
        CS1 on cp */
        For (RA in resource-assess-set)
        {
            If (((CS1.Begin→RA) in DG) && ((RA→CS2.End)
            in DG)))
                return false;
            If (((CS2.Begin→RA) in DG) && ((RA→CS1.End)
            in DG)))
                return false;
        }
    }
}
```

At block 650, optimizations may be applied to hide resource access latency. Any optimization approach may be applied, for example, those mentioned above along with the FIG. 5 description.

Although an example embodiment of the disclosed subject matter is described with reference to block and flow diagrams in FIGS. 1-6, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A computer-implemented method for compiling code, comprising:
   identifying critical sections in the code;
   minimizing the identified critical sections;
   constructing an instruction dependence graph of instructions in the code;
   generating a summarized dependence graph based on the instruction dependence graph; and
   merging at least two of the critical sections based on the summarized dependence graph;
   wherein the summarized dependence graph includes only instructions for resource accesses and instructions that start and release the critical sections; and
   wherein minimizing the critical sections comprises using multiple threads to hide resource access latencies and using computations out of a critical section to hide resource access latency original in the critical section.

2. The method of claim 1, further comprising determining data dependence and control dependence of instructions in the code based on the critical section minimization.

3. The method of claim 1, wherein generating the summarized dependence graph comprises building a relative closure based on the instruction dependence graph.

4. The method of claim 1, wherein merging at least two of the critical sections comprises merging any two conjoint critical sections in the summarized dependence graph.

5. The method of claim 1, wherein merging at least two of the critical sections comprises merging a first critical section and a second critical section if there is no resource access instructions between the beginning instruction of the first critical section and the ending instruction of the second critical section or between the beginning instruction of the second critical section and the ending instruction of the first critical section in the summarized dependence graph.

6. The method of claim 1, further comprising applying a latency sensitive optimization approach to hide resource access latency to the code.

7. The method of claim 1, wherein a critical section comprises code that may be executed by only one thread at a time.

8. The method of claim 1, wherein a critical section comprises code that may be executed by only one processor at a time.

9. The method of claim 1, wherein minimizing the identified critical sections comprises moving a wait instruction from inside a first critical section to outside the first critical section.

10. An article comprising a machine-readable medium that contains instructions, which when executed by a processing platform, cause said processing platform to perform operations for compiling code, the operations including:
    identifying critical sections in the code;
    minimizing the identified critical sections;
    constructing an instruction dependence graph of instructions in the code;
    generating a summarized dependence graph based on the instruction dependence graph; and
    merging at least two of the critical sections based on the summarized dependence graph;
    wherein the summarized dependence graph includes only instructions for resource accesses and instructions that start and release the critical sections; and
    wherein minimizing the critical sections comprises using multiple threads to hide resource access latencies and using computations out of a critical section to hide resource access latency original in the critical section.

11. The article of claim 10, wherein the operations further comprise: constructing the instruction dependence graph of instructions in the code based on the critical section minimization.

12. The article of claim 11, wherein merging at least two of the critical sections comprises merging any two conjoint critical sections in the summarized dependence graph.

13. The article of claim 11, wherein merging at least two of the critical sections comprises merging a first critical section and a second critical section if there is no resource access instructions between the beginning instruction of the first critical section and the ending instruction of the second critical section or between the beginning instruction of the second critical section and the ending instruction of the first critical section in the summarized dependence graph.

* * * * *